(12) United States Patent
Hazama et al.

(10) Patent No.: US 7,354,371 B2
(45) Date of Patent: Apr. 8, 2008

(54) MOTOR-INCORPORATED HYPOCYCLOID-TYPE SPEED REDUCER

(75) Inventors: Shinichiro Hazama, Toyota (JP); Haruo Suzuki, Obu (JP); Akinori Hoshino, Nisshin (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 220 days.

(21) Appl. No.: 11/353,984

(22) Filed: Feb. 15, 2006

(65) Prior Publication Data
US 2006/0189430 A1 Aug. 24, 2006

(30) Foreign Application Priority Data
Feb. 22, 2005 (JP) ............... 2005-045929

(51) Int. Cl.
*F16H 48/06* (2006.01)
(52) U.S. Cl. ............ 475/149; 475/162; 475/169; 475/170; 475/177
(58) Field of Classification Search ............ None
See application file for complete search history.

(56) References Cited

U.S. PATENT DOCUMENTS

| | | | |
|---|---|---|---|
| 5,479,058 A * | 12/1995 | Seidou | 310/83 |
| 6,477,918 B2 * | 11/2002 | Sakamoto | 74/640 |
| 6,661,139 B1 * | 12/2003 | Moskob | 310/83 |
| 6,727,614 B2 * | 4/2004 | Neubauer et al. | 310/75 R |
| 6,857,981 B2 * | 2/2005 | Hori et al. | 475/149 |
| 2005/0215375 A1 * | 9/2005 | Kimura et al. | 475/149 |

FOREIGN PATENT DOCUMENTS

| | | |
|---|---|---|
| JP | 2000-118420 A | 4/2000 |
| JP | 2000-120810 A | 4/2000 |

\* cited by examiner

*Primary Examiner*—David D. Le
(74) *Attorney, Agent, or Firm*—Buchanan Ingersoll & Rooney PC

(57) ABSTRACT

A motor-incorporated hypocycloid-type speed reducer includes: a motor housed in a case; a first larger internal gear; a second smaller internal gear coaxial with a motor shaft; an output shaft coaxial with the motor shaft, the output shaft being provided with the second internal gear; and an external gear. A motor core of the motor is provided with an eccentric portion eccentric to the motor shaft at a predetermined degree. The external gear, which has a first external gear engaged with the first internal gear and a second external gear engaged with the second internal gear, is further provided with a rotor-receiving portion rotatable integrally with the eccentric portion of the motor core. The rotor-receiving portion is coaxial with the first external gear and the second external gear.

5 Claims, 2 Drawing Sheets

MOTOR-INCORPORATED HYPOCYCLOID-TYPE SPEED REDUCER

CROSS REFERENCE TO RELATED APPLICATIONS

This application is based on and claims priority under 35 U.S.C. §119 with respect to Japanese Patent Application 2005-045929 filed on Feb. 22, 2005 the entire content of which is incorporated herein by reference.

FIELD OF THE INVENTION

This invention relates to a motor-incorporated hypocycloid-type speed reducer in which an electric motor is mounted coaxially with a speed reducer, and the electric motor is integrated with the speed reducer.

BACKGROUND

Various types of speed reducers, in which a speed reducer is associated with an electric motor, have been conventionally known, for the purpose of obtaining high torque by use of a low rotational speed of the speed reducer. In most cases, components for a planetary gear-type speed reducer is assembled independently from assembling components for an electric motor, and the assembly of the speed reducer is then coupled together with the assembly of the electric motor to be a unit. For example, a speed reducer has been known, in which an input gear of a planetary gear-type speed reducer is associated, via pinion gears, with an output shaft of a motor. As another example, there is a speed reducer, in which an output shaft of a motor is fitted into a carrier arranged coaxially with an output shaft of a planetary gear-type speed reducer. As still another example, JP2000-120810A discloses a motor-incorporated speed reducer in which a rotor of a motor is integrated with a gear of a speed reducer (see paragraphs 0002-0007, paragraphs 0011-0019, and FIGS. 1, 3 and 4).

JP2000-118420A (see paragraphs 0011-0013, FIGS. 2 and 3) discloses a motor-driven power steering device having a hypocycloid gear mechanism having a single pinion that suffices for generating a high-speed reduction ratio, as illustrated in FIG. 2. More specifically, a motor shaft 32 is freely rotatably associated with an outer periphery of an output shaft 31. A rotor wound by coils 33 is arranged about the motor shaft 32. A permanent magnet 34 secured to a case is arranged at an outer periphery of the rotor. The motor shaft 32 extends along an axial direction of the output shaft 31. The motor shaft 32 is linked to the output shaft 31 via an offset shaft 35, a bearing 36, an eccentric gear 37 and a ring gear 38. The eccentric gear 37 is provided with a first gear portion 41, which rotates (revolves) in an eccentric manner along a ring gear 40 fixed to a case 39. A relationship between the first gear portion 41 of the eccentric gear 37 and the ring gear 40 establishes a hypocycloid gear mechanism.

In terms of reducing, via a speed reducer, a rotational speed outputted from a motor, i.e., in terms of increasing an output of a motor by use of a speed reducer, recent requirements have led to downsizing from the viewpoint of a limited space of an installation place. When a speed reducer is assembled independently from a motor, each of the speed reducer and the motor is required to have a shaft respectively. In such circumstances, a total axial length may be increased.

As aforementioned, when a rotor is integrated with a gear, a structure of a bearing may be complicated.

Further, for example, as is apparent from FIG. 2, a motor 1 is axially separated from the hypocycloid gear mechanism, which may increase an axial length.

The present invention has been made in view of the above circumstances, and provides a motor-incorporated hypocycloid-type speed reducer, in which a hypocycloid-type speed reducer is integrated with a motor, and an axial length of which is reduced.

SUMMARY OF THE INVENTION

According to an aspect of the present invention, a motor-incorporated hypocycloid-type speed reducer includes: a case; a motor housed in the case and having: a motor core supported by a first bearing to be rotatable about a motor shaft; coils wound around the motor core; and a magnet arranged centering on the motor shaft; a first internal gear housed in the case and arranged to be coaxial with the motor shaft; a second internal gear arranged to be coaxial with the motor shaft and having a diameter being smaller than a diameter of the first internal gear; an output shaft rotatably supported by a second bearing and arranged to be coaxial with the motor shaft, the output shaft being provided with the second internal gear; and an external gear having a first external gear, of which teeth are meshed with teeth of the first internal gear, and a second external gear, of which teeth are meshed with teeth of the second internal gear, the first external gear and the second eternal gear being formed to be coaxial with each other. The motor core is provided with an eccentric portion eccentric to the motor shaft at a predetermined degree. The external gear is provided with a rotor-receiving portion rotatable integrally with the eccentric portion of the motor core via a third bearing, the rotor receiving portion being coaxial with the first external gear and the second external gear.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow in detail with reference to the accompanying drawings.

Figure 1:
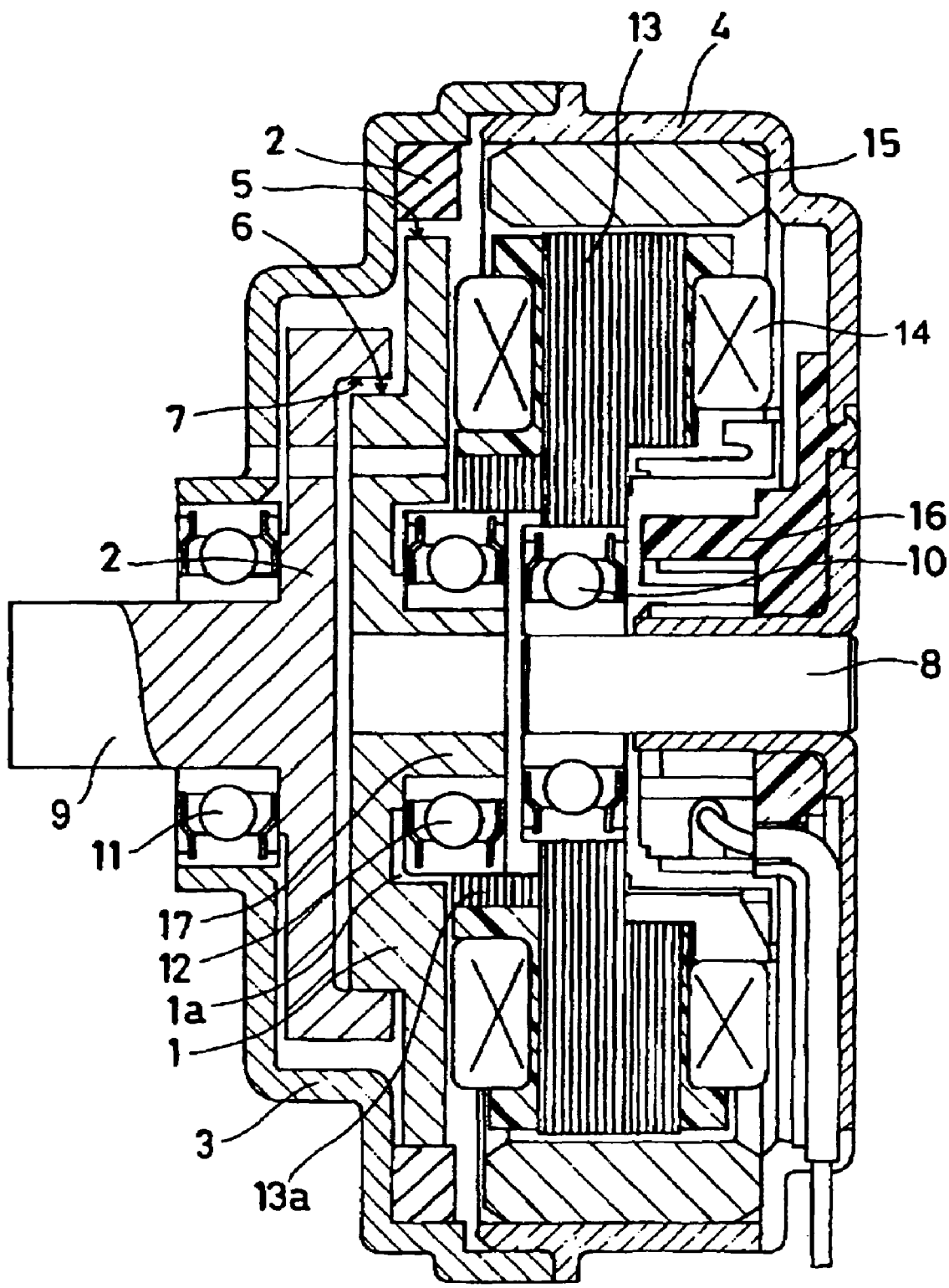
FIG. 1 is a motor-incorporated hypocycloid-type speed reducer according to an embodiment of the present invention.
Figure 2:
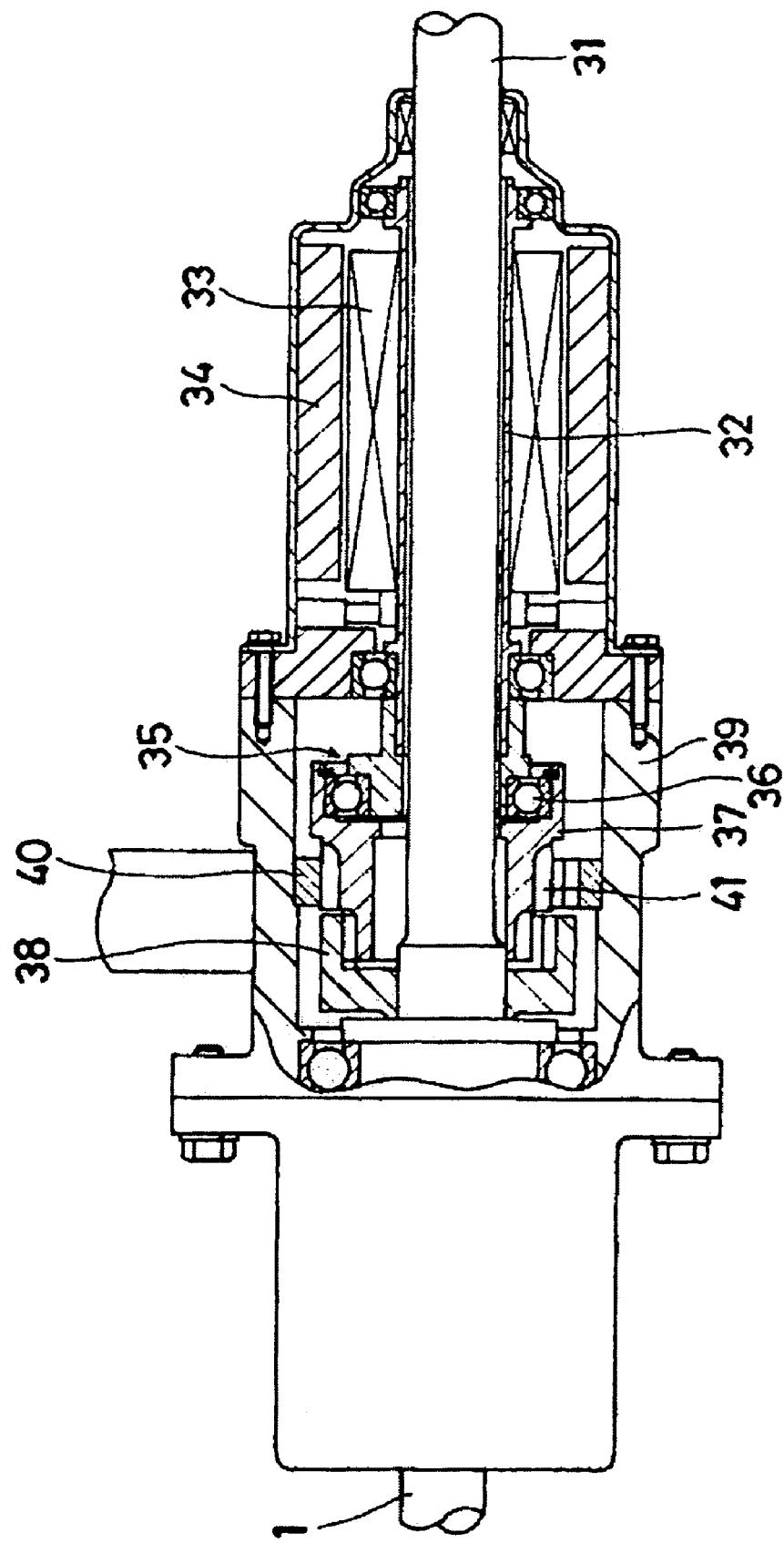
FIG. 2 is a cross sectional view illustrating a conventional motor-incorporated hypocycloid-type speed reducer.

As illustrated in FIG. 1, an entire case includes a first case 4 and a second case 3, which define a space inside thereof. A motor shaft 8 is fixed to a first case 4, while an output shaft 9 is rotatably supported by the second case 3 via a bearing 11 (i.e., a second bearing). The motor shaft 8 and the output shaft 9 are arranged to be substantially coaxial with each other, aside from an assembling error. Hereinafter, when components are described to be coaxial, a matter of an assembling error can be left out.

Inside the first case 4, a motor, which includes a motor core 13, coils 14, a permanent magnet 15 and a rectifier 16, is accommodated. The coils 14, which are wound around the motor core 13, are connected to an external power source via the rectifier 16. The motor core 13 is rotatably supported by the motor shaft 8 via a bearing 10 (i.e., a first bearing). The permanent magnet 15 is arranged at an outer periphery of the motor core 13. As illustrated in FIG. 1, at the left side of the motor core 13, an eccentric portion 13a is provided in such a manner that a cylindrically hollow space, which is eccentric relative to an axis of the motor shaft 8, is formed. The eccentric portion 13a is placed at a radially inner side of the coils 14 and at a side opposite to the rectifier 16 relative to the bearing 10.

The output shaft 9 is provided with an internal gear 7 (i.e., a second internal gear) with internal teeth formed on its inner periphery, inside of the case (the second case 3 according to the embodiment). The internal gear 7 is arranged at the right side of the output shaft 9 in FIG. 1 and to be coaxial with the output shaft 9. An external gear 1 is interposed between the internal gear 7 and the motor core 13. The external gear 1 is formed with or includes a first external gear 5 and a second external gear 6, which have outer teeth formed on their outer peripheries and are coaxial with each other. The first external gear 5 is formed at the right side of the second external gear 6 in FIG. 1. The first external gear 5 is designed to have a diameter greater than a diameter of the second external gear 6. The external gear 1 further includes a rotor receiving portion 17, which extends rightward in FIG. 1 from a radially inner side of the first external gear 5, and an outer shape of which is a cylindrical hollow. The rotor-receiving portion 17 is coaxial with first external gear 5 and the second external gear 6. An outer periphery of the rotor-receiving portion 17 is formed to be fitted, via a bearing 12 (i.e., a third bearing), into the eccentric portion 13a of the motor core 13. The eccentric portion 13a rotates (revolves) eccentrically relative to the output shaft 9 that is coaxial with the motor shaft 8, so that the external gear 1 (including the first external gear 5, the second external gear 6 and the rotor receiving portion 17) is also arranged in an eccentric manner relative to the output shaft 9.

An internal gear 2 (i.e., a first internal gear) is arranged radially outside the first external gear 5 and is fixed to the case (the second case 3 according to the embodiment). The internal gear 2 has inner teeth formed on its inner periphery and possesses a diameter greater than the diameter of the first external gear 5. The internal gear 2 is coaxial with the output shaft 9.

When a eccentric amount of an axis of the external gear 1 and of the eccentric portion 13a relative to the output shaft 9 or the motor shaft 8 is expressed by a parameter "e", a radius of the internal gear 7 of the output shaft 9 is determined at a value obtained by adding the parameter "e" with a radius of the second external gear 6 of the external gear 1. Likewise, a radius of the internal gear 2 is determined at a value obtained by adding the parameter "e" with a radius of the first external gear 5.

According to the motor-incorporated speed reducer having the above-described structure, when the motor is electrically exerted, i.e. is applied with electric current, the coils 14 of the motor core 13 are applied with electric current in response to a rotational position of the motor core 13. The motor core 13 rotating is magnetized and is attracted or repelled to the permanent magnet 15. The motor core 13 can rotate continuously by virtue of the rectifier 16. When the motor core 13 rotates about the motor shaft 8, the cylindrically hollow space inside the eccentric portion 13a rotates (revolves) in an eccentric manner relative to the motor shaft 8. The rotor-receiving portion 17 of the external gear 1 is fitted into the inner hollow of the eccentric portion 13a via the bearing 12. In such circumstances, the rotor-receiving portion 17 of the external gear 1 is biased via the bearing 12 in response to eccentric movement of the eccentric portion 13a of the motor core 13 and rotates in an eccentric manner.

The outer teeth of the first external gear 5 of the external gear 1 are gear-meshed with the inner teeth of the internal gear 2 fixed to the case 3. Therefore, the first external gear 5 rotates about its axis in response to a gear-meshing with the internal gear 2 while revolving in an eccentric manner relative to the motor shaft 8. Accordingly, a trajectory of the first external gear 5 becomes hypocycloid. Likewise, the second external gear 6 of the external gear 1 depicts a hypocycloid trajectory. The second external gear 6 is gear-meshed with the internal gear 7. Because the output shaft 9 is coaxial with the motor shaft 8 and is rotatably supported by the second case 3 via the bearing 11, the output shaft 9 rotates in response to rotation of the second external gear 6 engageable with the internal gear 7. In such circumstances, because the diameter of the internal gear 7 is smaller than the diameter of the internal ring gear 2, a rotational speed of the output shaft 9 is reduced relative to a rotational speed of the motor core 13, i.e., an output of the output shaft 9 is increased relative to an output of the motor core 13.

As described above, according to the embodiment of the present invention, the output shaft 9 outputs outside of the second case 3 at the left side of the bearing 11 in FIG. 1 and inputs inside of the second case 3 at the right side thereof. Therefore, only a single bearing such as the bearing 11 can be employed. Further, there is an only single bearing such as the bearing 12 employed so as to link the external gear 1 and the motor core 13. In other words, the rotor-receiving portion 17 of the external gear 1 can be mounted on the eccentric portion 3a of the motor core 13 via an only single bearing such as the bearing 12. Still further, there is an only single bearing such as the bearing 10 employed so as to rotatably support the motor core 13 as the rotor by the motor shaft 8. Therefore, an entire apparatus requires only three bearings, and an entire axial length of the motor-incorporated hypocycloid-type speed reducer can be shortened.

Moreover, according to the embodiment of the present invention, an only single bearing such as the bearing 12 is required to be interposed between the external gear 1 and the motor core 13, and other secondary or indirect components are not required. A recess 1a is defined at a radially inner side of the first external gear 5 of the external gear 1, and the bearing 12 is provided in this recess 1a. Therefore, the external gear 1 can be arranged to be very adjacent to the motor core 13. At a radially inner side of the motor core 13, the bearing 12 is placed at the left side of the bearing 10 in FIG. 1, while the rectifier 16 is placed at the right side thereof. Therefore, an entire axial length of the case incorporating the motor therein, i.e., an axial interval between the external gear 1 and the motor core 13, can be minimized. The entire axial length herein is a length in the left and right direction of the case in FIG. 1.

According to the embodiment of the present invention, in order to manufacture a motor-incorporated hypocycloid-type speed reducer, the case is configured with the first case 4, in which the motor is housed, and the second case 3 which rotatably supports the output shaft 9 via the bearing 11. The motor shaft 8 is fixed to the first case 4, and the motor core 13, the coils 14, the permanent magnet 15 and the rectifier 16 are fitted together inside the first case 4. The first case 4 and the second case 3 are coupled with each other in a condition where the external gear 1 and the bearing 12 are interposed between the first case 4 and the second case 3. Therefore, a motor-incorporated hypocycloid-type speed reducer can be easily manufactured.

The principles, the preferred embodiment and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A motor-incorporated hypocycloid-type speed reducer comprising:
    a case;
    a motor housed in the case and including:
        a motor core supported by a first bearing to be rotatable about a motor shaft and having an eccentric portion eccentric to the motor shaft at a predetermined degree;
        coils wound around the motor core; and
        a magnet arranged centering on the motor shaft;
    a first internal gear housed in the case and arranged to be coaxial with the motor shaft;
    a second internal gear arranged to be coaxial with the motor shaft and having a diameter being smaller than a diameter of the first internal gear;
    an output shaft rotatably supported by a second bearing and arranged to be coaxial with the motor shaft, the output shaft being provided with the second internal gear; and
    an external gear having a first external gear, of which teeth are meshed with teeth of the first internal gear, and a second external gear, of which teeth are meshed with teeth of the second internal gear, the first external gear and the second external gear being formed to be coaxial with each other, and the external gear being provided with a rotor receiving portion rotatable integrally with the eccentric portion of the motor core via a third bearing, the rotor receiving portion being coaxial with the first external gear and the second external gear.

2. A motor-incorporated hypocycloid-type speed reducer according to claim 1, wherein the case comprises a first case housing the motor therein and a second case rotatably supporting the output shaft via the second bearing, and the first case and the second case are jointed in a condition where the external gear and the third bearing are interposed between the first case and the second case.

3. A motor-incorporated hypocycloid-type speed reducer according to claim 2, wherein a recess is formed at a side of an inner side of the first external gear of the external gear, and the third bearing is arranged in the recess.

4. A motor-incorporated hypocycloid-type speed reducer according to claim 1, wherein a recess is formed at a side of an inner periphery of the first external gear of the external gear, and the third bearing is arranged in the recess.

5. A motor-incorporated hypocycloid-type speed reducer according to claim 4, wherein the case comprises a first case, which houses the motor therein, and a second case, which rotatably supports the output shaft via the second bearing, and the first case and the second case jointed in a condition where the external gear and the third bearing are interposed between the first case and the second case.

* * * * *